(12) United States Patent
Daniel et al.

(10) Patent No.: US 11,411,726 B2
(45) Date of Patent: Aug. 9, 2022

(54) CRYPTOGRAPHIC KEY GENERATION USING MULTIPLE RANDOM SOURCES

(71) Applicant: BRITISH TELECOMMUNICATIOSN PUBLIC LIMITED COMPANY, London (GB)

(72) Inventors: Joshua Daniel, London (GB); Ali Sajjad, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

(21) Appl. No.: 17/250,088

(22) PCT Filed: May 2, 2019

(86) PCT No.: PCT/EP2019/061237
§ 371 (c)(1),
(2) Date: Nov. 23, 2020

(87) PCT Pub. No.: WO2019/223980
PCT Pub. Date: Nov. 28, 2019

(65) Prior Publication Data
US 2021/0203495 A1 Jul. 1, 2021

(30) Foreign Application Priority Data
May 24, 2018 (EP) .................... 18174203

(51) Int. Cl.
*H04L 9/08* (2006.01)
(52) U.S. Cl.
CPC .......... *H04L 9/0869* (2013.01); *H04L 9/0852* (2013.01); *H04L 9/0877* (2013.01)

(58) Field of Classification Search
CPC ... H04L 9/0869; H04L 9/0852; H04L 9/0877; H04L 9/0897; H04L 63/062; G06F 7/588
(Continued)

(56) References Cited

U.S. PATENT DOCUMENTS

| 8,214,584 B2 | 7/2012 | Johnson |
| 8,572,410 B1 | 10/2013 | Tkacik et al. |

(Continued)

FOREIGN PATENT DOCUMENTS

| CA | 2991785 | 2/2017 |
| EP | 2645618 A1 | 10/2013 |

(Continued)

OTHER PUBLICATIONS

European Search Report for application EP18174203, dated Jul. 5, 2018, 10 pages.

(Continued)

*Primary Examiner* — Sanchit K Sarker
(74) *Attorney, Agent, or Firm* — Patterson Thuente IP

(57) ABSTRACT

A computer implemented method of generating cryptographic keys for a hardware security module (HSM), the method including generating a plurality of cryptographic keys and storing the cryptographic keys for use by the HSM in providing cryptography functions, wherein the cryptographic keys are generated based on numerical data generated by a hardware random number generator, such that a rate of generation of the cryptographic keys unconstrained by the resources of the HSM, wherein the hardware random number generator operates based on a plurality of statistically random entropy data sources originating from natural phenomena so as to increase a degree of randomness of the numerical data.

7 Claims, 4 Drawing Sheets

(58) Field of Classification Search
USPC .......................................... 380/44; 713/151
See application file for complete search history.

(56) References Cited

U.S. PATENT DOCUMENTS

| | | | |
|---|---|---|---|
| 9,141,303 | B2 | 9/2015 | Kishi et al. |
| 9,189,609 | B1 | 11/2015 | Antony |
| 9,569,176 | B2* | 2/2017 | Venkata ................ G06F 7/58 |
| 9,608,810 | B1 | 3/2017 | Ghetti et al. |
| 10,038,557 | B2 | 7/2018 | Dimitrakos et al. |
| 10,091,183 | B2 | 10/2018 | Stumpf et al. |
| 10,341,118 | B2 | 7/2019 | Yang et al. |
| 10,389,709 | B2 | 8/2019 | Potlapally et al. |
| 10,420,879 | B2 | 9/2019 | Heck et al. |
| 10,461,943 | B1* | 10/2019 | Norum ............... H04L 63/0823 |
| 10,505,721 | B2 | 12/2019 | Dimitrakos et al. |
| 10,541,811 | B2* | 1/2020 | Peddada ............. H04L 9/0877 |
| 10,607,018 | B2 | 3/2020 | Amidi |
| 10,972,263 | B2* | 4/2021 | Gryb .................. G06F 21/575 |
| 11,025,429 | B2 | 6/2021 | Enke et al. |
| 2004/0039925 | A1* | 2/2004 | McMillan ............ H04L 63/06 |
| | | | 713/150 |
| 2005/0235143 | A1 | 10/2005 | Kelly |
| 2008/0022385 | A1 | 1/2008 | Crowell et al. |
| 2008/0263372 | A1 | 10/2008 | Sako et al. |
| 2009/0222631 | A1 | 9/2009 | Sugiura |
| 2009/0323967 | A1* | 12/2009 | Peirce ................ H04L 9/0869 |
| | | | 380/278 |
| 2011/0231671 | A1 | 9/2011 | Locker et al. |
| 2011/0271073 | A1 | 11/2011 | Ikeda et al. |
| 2011/0296197 | A1 | 12/2011 | Konetski et al. |
| 2012/0036370 | A1 | 2/2012 | Lim et al. |
| 2012/0117381 | A1 | 5/2012 | Lo et al. |
| 2012/0297189 | A1 | 11/2012 | Hayton et al. |
| 2013/0097421 | A1 | 4/2013 | Lim |
| 2013/0191648 | A1 | 7/2013 | Bursell |
| 2013/0243197 | A1 | 9/2013 | Sherwood et al. |
| 2014/0149666 | A1 | 5/2014 | Nakagawa et al. |
| 2014/0208111 | A1 | 7/2014 | Brandwine et al. |
| 2014/0282539 | A1 | 9/2014 | Sonnek |
| 2014/0380035 | A1 | 12/2014 | Marinelli et al. |
| 2015/0222606 | A1 | 8/2015 | Yan |
| 2016/0261408 | A1 | 9/2016 | Peddada et al. |
| 2016/0342394 | A1 | 11/2016 | Tsirkin |
| 2016/0344724 | A1 | 11/2016 | Shoshan |
| 2016/0352516 | A1* | 12/2016 | Oberheide ............ H04L 9/0897 |
| 2017/0052907 | A1 | 2/2017 | Price, Jr. et al. |
| 2017/0286695 | A1 | 10/2017 | Shetty |
| 2017/0286696 | A1 | 10/2017 | Shetty et al. |
| 2017/0286698 | A1* | 10/2017 | Shetty ................ G06F 21/6218 |
| 2017/0288863 | A1 | 10/2017 | Dimitrakos et al. |
| 2017/0288871 | A1 | 10/2017 | Dimitrakos et al. |
| 2017/0048061 | A1 | 12/2017 | Bohdan |
| 2018/0323967 | A1* | 11/2018 | Courtney ............. H04L 9/0643 |
| 2018/0332011 | A1 | 11/2018 | Gray |
| 2019/0034218 | A1 | 1/2019 | El-Moussa et al. |
| 2019/0034645 | A1 | 1/2019 | El-Moussa et al. |
| 2019/0050247 | A1 | 2/2019 | El-Moussa et al. |
| 2021/0218564 | A1* | 7/2021 | Daniel ................ H04L 9/0877 |
| 2021/0248266 | A1 | 8/2021 | Giubilo et al. |

FOREIGN PATENT DOCUMENTS

| | | |
|---|---|---|
| GB | 2472491 A | 2/2011 |
| JP | 2015061267 A | 3/2015 |
| WO | WO 2008141167 | 11/2008 |
| WO | WO-2013091221 A1 | 6/2013 |
| WO | WO-2017116260 A1 | 7/2017 |
| WO | WO-2017129657 A1 | 8/2017 |

OTHER PUBLICATIONS

GB Combined Search and Examination Report for GB Application No. GB1808602.5, dated Nov. 26, 2018, 5 pages.
International Search Report and Written Opinion, Application No. PCT/EP2019/06123 7, dated May 27, 2019, 15 pages.
Saboonchi N., "Hardware Security Module Performance Optimization by Using a "Key Pool"," XP055487989, Dec. 25, 2014, Retrieved from the Internet: https://people.kth.se/~maguire/DEGREE-PROJECT-REPORTS/141225-Nima_Saboonchi-with-cover.pdf [retrieved on Jun. 26, 2018], 71 pages.
Bragg R., "The Encrypting File System," How EFS Works, Jun. 29, 2009, retrieved from: https://technet.microsoft.com/enus/library/cc700811.aspx#mainSection on Jul. 26, 2018, 14 pages.
Bremer J., "Intercepting System Calls on x86_64 Windows," May 15, 2012, Development & Security, retrieved from: http://jbremer.org/intercepting-system-calls-onx8664-windows/ on Jul. 26, 2018, pp. 1-9.
"Cloud Discovery Data Anonymization," Anonymize user data in Cloud App Security, Microsoft Docs, Apr. 20, 2020, Retrieved From the Internet: https://docs.microsoft.com/en-us/cloud-app-security/cloud-discovery-anonymizer, 8 pages.
Extended Search Report for European Application No. EP18169177.5, dated Oct. 9, 2018, 10 pages.
GB Combined Search and Examination Report for GB Application No. GB1806724.9 dated Nov. 13, 2018, 10 pages.
GB Combined Search and Examination Report for GB Application No. GB1808601.7 dated Nov. 26, 2018, 5 pages.
Hunt G., et al., "Detours: Binary Interception of Win32 Functions," Proceedings of the 3rd USENIX Windows NT Symposium, Jul. 1999, retrieved from: http://research.microsoft.com/sn/detours, pp. 1-9.
International Preliminary Report on Patentability for Application No. PCT/EP2015/071773, dated Apr. 6, 2017, 7 pages.
International Preliminary Report on Patentability for Application No. PCT/EP2015/072000, dated Apr. 6, 2017, 9 pages.
International Search Report and Written Opinion for Application No. PCT/EP2015/071773, dated Oct. 26, 2015, 8 pages.
International Search Report and Written Opinion for Application No. PCT/EP2015/072000, dated Nov. 4, 2015, 10 pages.
International Search Report and Written Opinion for Application No. PCT/EP2019/056886, dated Apr. 9, 2019, 12 pages.
International Search Report and Written Opinion for PCT Application No. PCT/EP2017/051339 dated Mar. 31, 2017, 10 pages.
International Search Report and Written Opinion for PCT Application No. PCT/EP2017/051610 dated Mar. 31, 2017, 8 pages.
International Search Report and Written Opinion for PCT Application No. PCT/EP2017/051613 dated Apr. 20, 2017, 10 pages.
International Search Report and Written Opinion for PCT Application No. PCT/EP2017/051614 dated Mar. 31, 2017, 8 pages.
International Search Report and Written Opinion for PCT Application No. PCT/EP2019/061236 dated Jun. 3, 2019, 17 pages.
Kim S.W., "Intercepting System API Calls," Intel® Software, Mar. 7, 2012, 13 pages.
"Luna HSM", anonymous, XP055488416, Aug. 10, 2013, retrieved from http://www.cc.com.pl/pl/prods/safenet/pdf/SafeNet_Product_Brief_Luna_SA.pdf, 2 pages.
Muller T, et al., "TreVisor: OS-Independent Software-Based Full Disk Encryption Secure against Main Memory Attacks," ACNS 2012, Jun. 26, 2012, pp. 66-83.
Myers D.S et al., "Intercepting Arbitrary Functions on Windows, UNIX, and Macintosh OS X Platforms," CS-TR-4585, UMIACS-TR-2004-28, Jan. 2004, 9 pages.
Neuman B.C., et al., "Kerberos: An Authentication Service for Computer Networks," ISI Research Report, ISI/RS-94-399, Sep. 1994, 8 pages.
Popek G.J., et al., "Formal Requirement for Virtualizable Third Generation Architectures," Communications of the AMC, Jul. 1974, vol. 17 (7), pp. 412-421.
Search Report for European Application No. EP18174202 dated Jul. 10, 2018, 11 pages.
VMware, Inc, "vSphere Storage—Update 1," Modified Jul. 12, 2018, VMware vSphere 6.0, VMware ESXi 6.0, vCenter Server 6.0, 315 pages.

(56) References Cited

OTHER PUBLICATIONS

Zhang F., et al., "CloudVisor: Retrofitting Protection of Virtual Machines in Multi-tenant Cloud with Nested Virtualization," SOSP'11, Oct. 23, 2011, pp. 203-216.

* cited by examiner

US 11,411,726 B2

CRYPTOGRAPHIC KEY GENERATION USING MULTIPLE RANDOM SOURCES

PRIORITY CLAIM

The present application is a National Phase entry of PCT Application No. PCT/EP2019/061237, filed May 2, 2019, which claims priority from EP Patent Application No. 18174203.2, filed May 24, 2018, each of which is hereby fully incorporated herein by reference.

TECHNICAL FIELD

The present disclosure relates to improvements to the generation of cryptographic keys.

BACKGROUND

Hardware Security Modules (HSMs) are network-connected physical devices tasked with the secure generation, storage and provision of cryptographic keys for use by consuming resources such as computer systems, appliances, devices, software and users. For example, HSMs generate, store and provide public/private key pairs. HSMs employ deterministic random number generators to generate pseudo-random numbers for cryptographic key generation. An increasing use of technologies such as internet-of-things communications, distributed data structures for trusted storage of data and transactions (e.g. blockchains) and inter-communicating virtualized computer systems requires the generation of increasingly large volumes of cryptographic keys. The challenge is especially acute in view of the sheer volume of single use keys being requested of HSMs and being used and disposed over relatively short periods.

The use of pseudo-random numbers as a basis for key generation is widely acknowledged to be vulnerable due to their deterministic nature. Thus, the key generation facilities of such HSMs are not suitable for high-volume key generation. HSMs are also subject to strict compliance requirements. These compliance requirements can include, for example: the Common Criteria for Information Technology Security Evaluation (abbreviated as Common Criteria or CC) (international standard ISO/IEC 15408) for computer security certification; and Federal Information Processing Standard (FIPS) Publication 140-2, (FIPS PUB 140-2), a U.S. government computer security standard used to approve cryptographic modules. The need for such compliance leads to constraints on HSM capabilities such as rates of undertaking cryptography operations including key generation. Furthermore, the very nature of HSMs as secure and compliant components protected from interference and tampering renders them unsuitable or impossible for modification such as upgrading to increase processor, memory or other resources.

Thus, there is a challenge in providing requisite cryptographic operations to satisfy the growing demands of modern technology while retaining the necessary security compliance provided by HSMs.

SUMMARY

The present disclosure accordingly provides, in a first aspect, a computer implemented method of generating cryptographic keys for a hardware security module (HSM), the method comprising: generating a plurality of cryptographic keys and storing the cryptographic keys for use by the HSM in providing cryptography functions, wherein the cryptographic keys are generated based on numerical data generated by a hardware random number generator, such that a rate of generation of the cryptographic keys unconstrained by the resources of the HSM, wherein the hardware random number generator operates based on a plurality of statistically random entropy data sources originating from natural phenomena so as to increase a degree of randomness of the numerical data.

In some embodiments the generated cryptographic keys are stored in the HSM by invoking a storage function of the HSM.

In some embodiments storage of the cryptographic keys in the HSM is scheduled to occur at times when the HSM is operating in a low utilization state relative to an average utilization state of the HSM.

In some embodiments the natural phenomena include one or more of: one or more statistically random noise signals; and quantum phenomena such as photoelectric effects.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
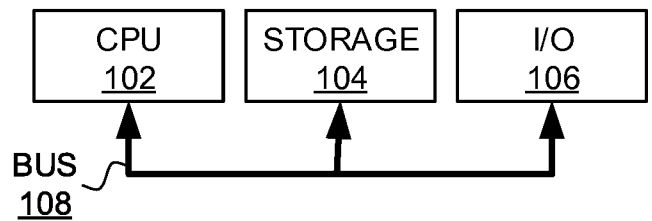
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
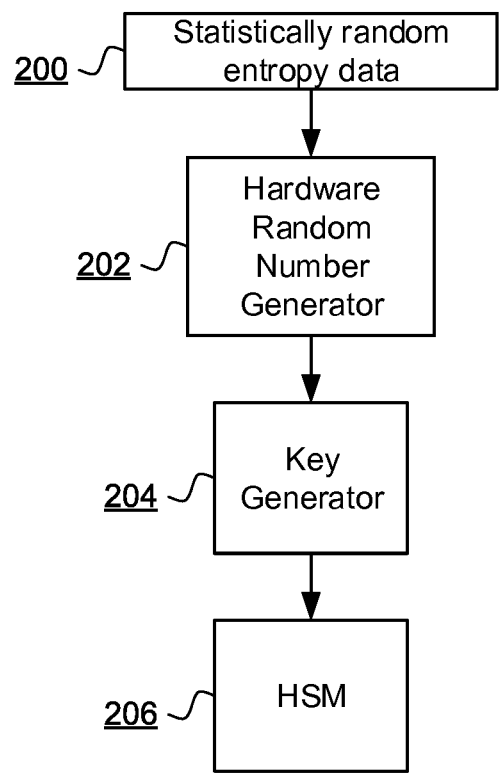
FIG. 2 is a component diagram of a computer implemented method of generating cryptographic keys for an HSM in accordance with an embodiment of the present disclosure.

FIG. 2 is a component diagram of a computer implemented method of generating cryptographic keys for an HSM 206 in accordance with an embodiment of the present disclosure. The HSM 206 is provided as a physical or virtualized compliant security module for providing cryptography functions for computing, networking, communications, data storage and other applications as will be apparent to those skilled in the art. The HSM 206 can include functions suitable for triggering the generation, storage and use of cryptographic keys. According to embodiments of the present invention, the HSM 206 is at least partly, and in some embodiments wholly, relieved of the task of cryptographic key generation in order that such generation can be performed in a manner that is unconstrained by the resources of the HSM 206 and that does not suffer the considerable disadvantages of key generation based on deterministic random number generation.

Cryptographic keys are generated by a key generator 204 as a secure hardware, software, firmware or combination component. The key generator 204 is provided with computing resources sufficient for the generation of large quantities of cryptographic keys and, in particular, for the generation of quantities of cryptographic keys exceeding at a rate exceeding the generation of keys by the HSM 206.

The key generator 204 operates on the basis of random numbers generated by a hardware random number generator 202 which generates random numbers based on statistically random entropy data 200. Hardware random number generators can be known in the art as "Truly random number generators" (TRNG), the word "truly" being accepted by those skilled in the art but being better described as a hardware random number generator. The hardware random number generator 202 provides random numbers on the basis of the statistically random entropy data 200 which can include, for example, physical phenomena such as statistically random "noise" signals such as thermal noise, photoelectrical noise, beam splitting and/or other quantum phenomena.

Thus, in use, cryptographic key generation takes place away from the HSM 206 based on a hardware random number generator 202. Accordingly, the determinism of the random numbers used as a basis for key generation is considerably reduced and security of generated keys considerably enhanced. Furthermore, the key generator 204 is unconstrained by the resources of the HSM 206 so permitting the generation of keys in volumes exceeding that possible by the HSM 206.

Keys generated by the key generator 204 are stored for use by the HSM 206. In some embodiments, the keys are stored in the HSM 206 by a storage function of the HSM 206, key storage being a typical core function of a HSM. In use, the HSM 206 can be populated with generated keys by the key generator 204 such that the HSM 206 can utilize keys as required by consuming entities operating with the HSM 206. Since the performance of the HSM 206 is constrained, it is beneficial if the process of triggering storage operations for keys in the HSM 206 is scheduled to occur at times when the HSM 206 is operating in a low utilization state. For example, when demands on the HSM 206 are relatively lower than an average utilization state of the HSM 206, the key generator 204 can populate a storage for keys in the HSM 206 for subsequent use by the HSM 206. Additionally, or alternatively, key population of the HSM 206 can be triggered by a rate, extent or level of consumption of keys by the HSM 206 such that, for example, when a number of available keys in the HSM 206 falls below a threshold number or proportion, or when a rate of consumption meets a threshold rate, the key generator 204 can operate to populate the HSM 206 with further keys.

Figure 3:
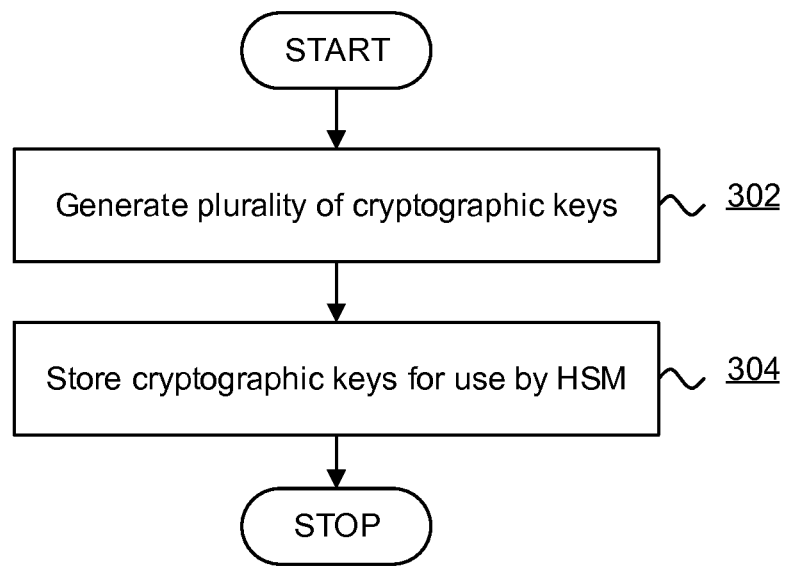
FIG. 3 is a flowchart of a computer implemented method of generating cryptographic keys for an HSM in accordance with an embodiment of the present disclosure.

FIG. 3 is a flowchart of a computer implemented method of generating cryptographic keys for an HSM 206 in accordance with an embodiment of the present disclosure. Initially, at 302, the method generates a plurality of cryptographic keys for use by the HSM 206 in providing cryptography functions. The keys are generated based on numerical data generated by the hardware random number generator 202. At 304 the cryptographic keys are stored for use by the HSM 206.

Figure 4:
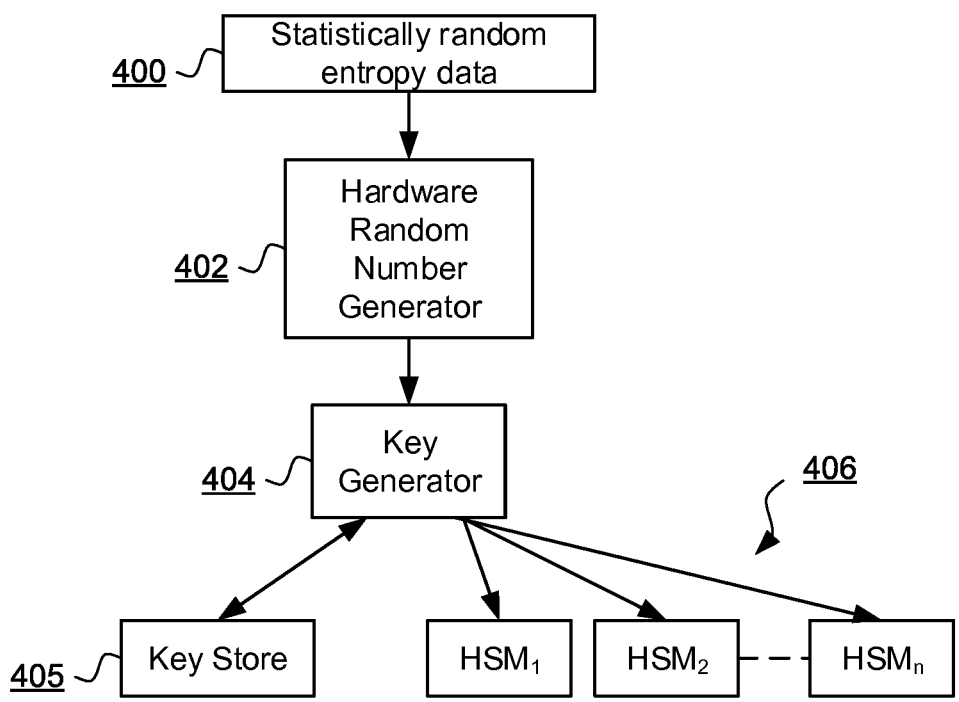
FIG. 4 is a component diagram of a computer implemented method of generating cryptographic keys for a plurality of HSMs in accordance with an embodiment of the present disclosure.

FIG. 4 is a component diagram of a computer implemented method of generating cryptographic keys for a plurality of HSMs 406 in accordance with an embodiment of the present disclosure. Many of the elements of FIG. 4 are identical to those described above with respect to FIG. 2 and these will not be repeated here. The arrangement of FIG. 4 differs in that a plurality of HSMs 406 are provided for the consumption of keys generated by the key generator 404. To accommodate the consumption of keys by multiple HSMs 406 and to ensure key availability in sufficient volumes to satisfy the potentially collectively high demand for keys by the HSMs 406, the key generator 404 stores generated keys in a secure key store 405 external to the HSMs 406. In this way, a rate of key storage by the key generator 404 is not hindered by any particular or generalized performance constraint resulting from the available resources of one or more of the HSMs 406. Thus, the key generator 404 generates keys in volume and securely stores the keys in the key store 405. Subsequently, requirements for keys arising in an HSM 406 can be satisfied by populating such HSM with already generated keys stored in the key store 405. The provision of keys to a HSM in the set of HSMs 406 can be undertaken by the key generator 404 or a separate secure component (not illustrated). For example, the key generator 404 can recognize or respond to a requirement for keys by a HSM and satisfy the requirement by providing keys to the HSM from the key store 405. The keys can be stored in such a HSM by, for example, a key storage function of the HSM.

To permit efficient management of the keys in the key store 405 and recognize keys that are utilized by an HSM, keys that are provided to a HSM for use are flagged as utilized in the key store 405. In this way, flagged keys can be identified to prevent multiple HSMs utilizing the same key.

Figure 5:
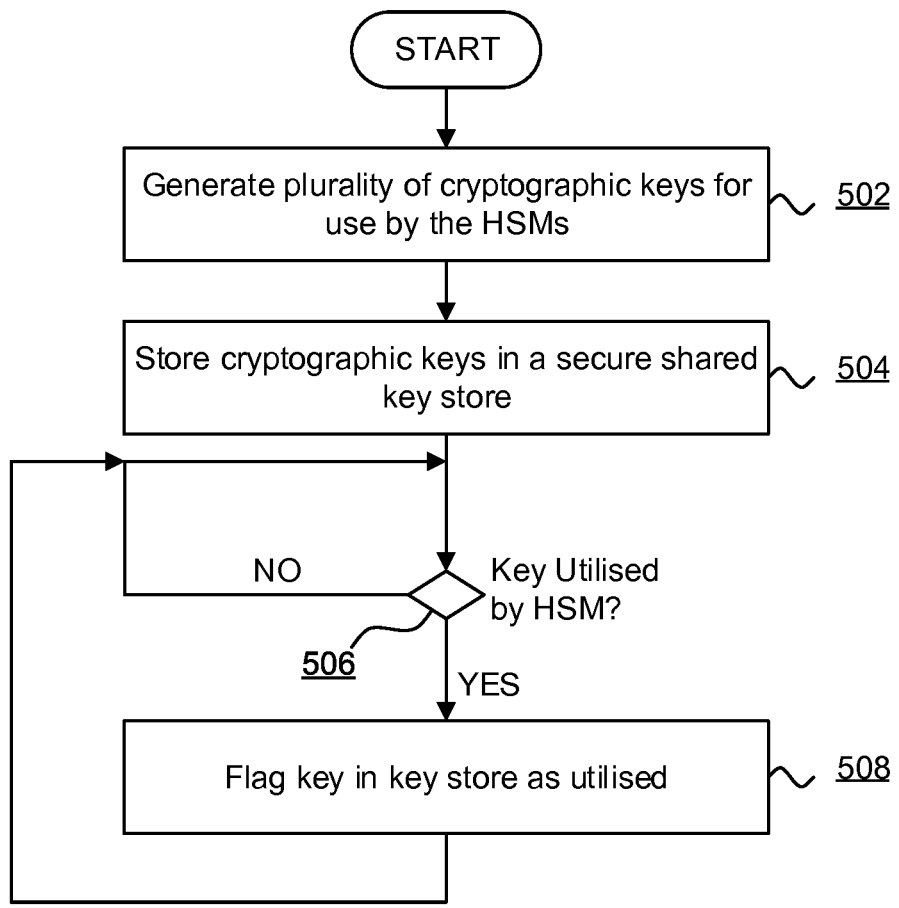
FIG. 5 is a flowchart of a computer implemented method of generating cryptographic keys for a plurality of HSMs in accordance with an embodiment of the present disclosure.

FIG. 5 is a flowchart of a computer implemented method of generating cryptographic keys for a plurality of HSMs in accordance with an embodiment of the present disclosure. Initially, at 502, the method generates a plurality of cryptographic keys for use by a plurality of HSMs 406. The keys are generated based on numerical data generated by the hardware random number generator 402. At 504 the cryptographic keys are securely stored in a key store 405 for use by the HSMs 406. At 506 the method determines if a key is utilized by a HSM and, where a key is utilized, the key is flagged as utilized at 508.

Figure 6:
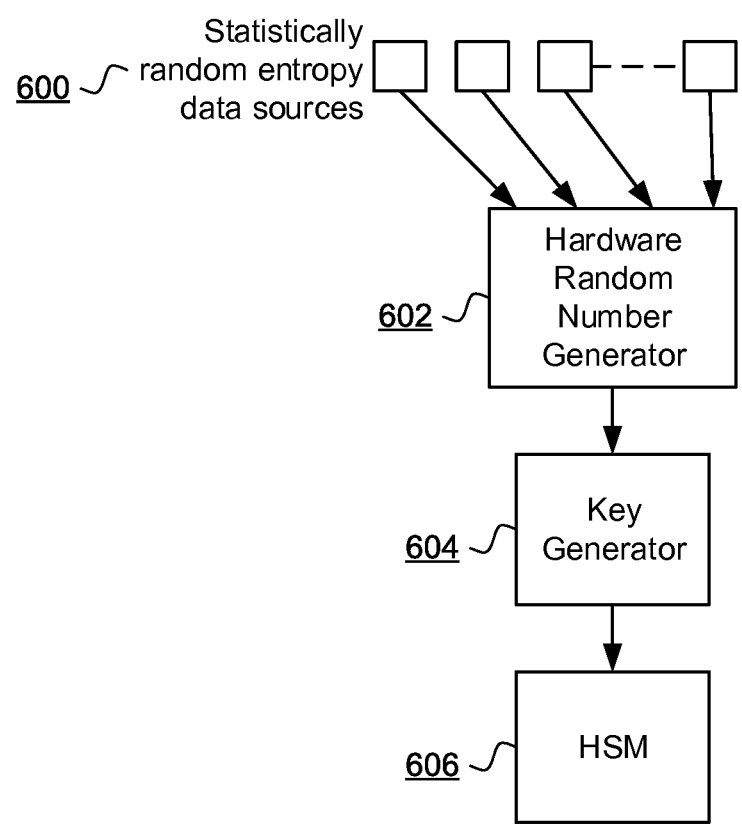
FIG. 6 is a component diagram of a computer implemented method of generating cryptographic keys for an HSM in accordance with an embodiment of the present disclosure.

FIG. 6 is a component diagram of a computer implemented method of generating cryptographic keys for an HSM 606 in accordance with an embodiment of the present disclosure. Many of the features of FIG. 6 are identical to those described above with respect to FIG. 2 and these will not be repeated here. FIG. 6 further includes a plurality of statistically random entropy data sources 600, such as the data sources previously described with respect to FIG. 2. Thus, in embodiments according to the arrangement of FIG.

6 the hardware random number generator 602 operates based on the plurality of data sources 600 so as to increase a degree of randomness of the numerical data on which basis the key generator 604 generates keys.

In one embodiment, the selection or number of data sources is informed by a consuming HSM 606 so as to increase the non-deterministic nature of the random number generation utilized for key generation.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the invention is not limited thereto and that there are many possible variations and modifications which fall within the scope of the invention.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of generating cryptographic keys for a hardware security module (HSM), the method comprising:
generating a plurality of cryptographic keys; and
storing the generated plurality of cryptographic keys in a key store of the HSM for use in providing cryptography functions upon occurrence of a trigger selected from the group consisting of: a number of available keys in the HSM falling below a threshold number, a number of available keys in the HSM falling below a threshold proportion, and a rate of consumption of keys meeting a threshold rate, wherein the plurality of cryptographic keys are generated based on numerical data generated by a hardware random number generator, such that generation of the cryptographic keys is unconstrained by resources of the HSM,
wherein the hardware random number generator operates based on a plurality of statistically random entropy data sources originating from natural phenomena so as to increase a degree of randomness of the numerical data.

2. The method of claim 1, wherein the generated plurality of cryptographic keys are stored in the HSM by invoking a storage function of the HSM.

3. The method of claim 2, wherein storage of the plurality of cryptographic keys in the HSM is scheduled to occur at times when the HSM is operating in a low utilization state relative to an average utilization state of the HSM.

4. The method of claim 1, wherein the natural phenomena include one or more of: one or more statistically random noise signals; or quantum phenomena.

5. The method of claim 4, wherein the quantum phenomena are photoelectric effects.

6. A computer system comprising:
a processor and memory storing computer program code for generating cryptographic keys for a hardware security module (HSM) by:
generating a plurality of cryptographic keys; and
storing the generated plurality of cryptographic keys in a key store of the HSM for use in providing cryptography functions upon occurrence of a trigger selected from the group consisting of: a number of available keys in the HSM falling below a threshold number, a number of available keys in the HSM falling below a threshold proportion, and a rate of consumption of keys meeting a threshold rate, wherein the plurality of cryptographic keys are generated based on numerical data generated by a hardware random number generator, such that generation of the cryptographic keys is unconstrained by resources of the HSM,
wherein the hardware random number generator operates based on a plurality of statistically random entropy data sources originating from natural phenomena so as to increase a degree of randomness of the numerical data.

7. A non-transitory computer-readable storage medium storing a computer program element comprising computer program code to, when loaded into a computer system and executed thereon, cause the computer system to generate cryptographic keys for a hardware security module (HSM) by:
generating a plurality of cryptographic keys; and
storing the generated plurality of cryptographic keys in a key store of the HSM for use in providing cryptography functions upon occurrence of a trigger selected from the group consisting of: a number of available keys in the HSM falling below a threshold number, a number of available keys in the HSM falling below a threshold proportion, and a rate of consumption of keys meeting a threshold rate, wherein the plurality of cryptographic keys are generated based on numerical data generated by a hardware random number generator, such that generation of the cryptographic keys is unconstrained by resources of the HSM,
wherein the hardware random number generator operates based on a plurality of statistically random entropy data sources originating from natural phenomena so as to increase a degree of randomness of the numerical data.

* * * * *

UNITED STATES PATENT AND TRADEMARK OFFICE
CERTIFICATE OF CORRECTION

PATENT NO. : 11,411,726 B2
APPLICATION NO. : 17/250088
DATED : August 9, 2022
INVENTOR(S) : Joshua Daniel It is certified that error appears in the above-identified patent and that said Letters Patent is hereby corrected as shown below:

On the Title Page

In Column 1, item (71), under Applicant, Line 2, delete "TELECOMMUNICATION" and insert -- TELECOMMUNICATIONS --, therefor.

In figure, for step "506", Line 1, delete "Utilised" and insert -- Utilized --, therefor.

In figure, for step "508", Line 1, delete "utilised" and insert -- utilized --, therefor.

On page 2, in Column 2, item (56), under OTHER PUBLICATIONS, Line 29, delete "Reporton" and insert -- Report on --, therefor.

In the Drawings

Sheet 3 of 4, FIG. 5, for step "506", Line 1, delete "Utilised" and insert -- Utilized --, therefor.

Sheet 3 of 4, FIG. 5, for step "508", Line 1, delete "utilised" and insert -- utilized --, therefor.

In the Specification

In Column 2, Line 34, delete "diagram a" and insert -- diagram of a --, therefor.

In Column 3, Line 13, delete "invention," and insert -- disclosure, --, therefor.

In Column 3, Line 19, delete "random number generation." and insert -- random number generator. --, therefor.

In Column 4, Line 46, delete "HSMs utilizing" and insert -- HSMs from utilizing --, therefor.

In Column 5, Lines 7-8, delete "random number generation" and insert -- random number Signed and Sealed this
Second Day of January, 2024

Katherine Kelly Vidal
*Director of the United States Patent and Trademark Office*

CERTIFICATE OF CORRECTION (continued)
U.S. Pat. No. 11,411,726 B2 generator --, therefor.

In Column 5, Line 16, delete "invention." and insert -- disclosure. --, therefor.

In Column 5, Line 31, delete "invention." and insert -- disclosure. --, therefor.

In Column 5, Line 35, delete "invention" and insert -- disclosure --, therefor.

In Column 5, Line 37, delete "invention." and insert -- disclosure. --, therefor.